United States Patent [19]

Frakes

[11] 3,751,792

[45] Aug. 14, 1973

[54] METHOD OF FORMING A WELDED JOINT CONSTRUCTION

[75] Inventor: Paul V. Frakes, Williamsport, Pa.

[73] Assignee: The Gazer Corporation, Williamsport, Pa.

[22] Filed: June 23, 1971

[21] Appl. No.: 155,806

[52] U.S. Cl.............. 29/471.1, 29/482, 285/189, 285/286, 287/189.36 B
[51] Int. Cl............................................ B23k 31/02
[58] Field of Search.................. 29/157.4, 482, 483, 29/471.1; 285/189, 286; 287/189.36 B

[56] References Cited
UNITED STATES PATENTS
1,291,600  1/1919  Murray............................. 29/157.4
1,293,868  2/1919  Murray............................. 29/157.4
1,729,180  9/1929  Murray......................... 29/157.4 X
2,588,241  3/1952  Huffman....................... 29/470.5 X Primary Examiner—Richard B. Lazarus
Attorney—Andrew R. Klein, Robert J. Zinn et al.

[57] ABSTRACT

A welded joint construction for tubular members and a method of welding the same whereby a horizontal member of substantially rectangular cross section is radially notched to partially accommodate a vertically oriented cylindrical member having an outside diameter approximately equal to the inside width of the rectangular member whereafter the cylindrical member is positioned within the partially accommodating notched portion of the rectangular member and the vertical edges of the rectangular member are welded to the face of the cylindrical member juxtaposed thereto.

7 Claims, 4 Drawing Figures

PATENTED AUG 14 1973

3,751,792

INVENTOR.
Paul V. Frakes
BY Synnestvedt Lechner
ATTORNEYS 3,751,792

METHOD OF FORMING A WELDED JOINT CONSTRUCTION

BACKGROUND OF THE INVENTION

The desire to relieve internal stresses normally resulting from the welding of two components is the primary reason prompting the organization of components in the manner outlined by this invention. Other equally important factors, including the mechanical strength characteristics of the components used, influence the novel design. Both of these considerations result in a joint construction which constitutes an ideal arrangement.

Initial consideration is given to the internal stresses normally resulting from a welding operation. Stress forces are known to be inversely proportional to the depth of penetration of a weld. This results from the fact that a metal bead laid between abutting metal plates by a welder heats up edges of the metal plates in immediate proximity to the weld such that the metal plates first expand in the area of the abutting members; whereafter as the weld build-up cools it contracts. This contraction is proportional to the volume of built-up material such that the greater the build-up the greater the degree of contraction. The contraction occurs toward the center line of the build-up, the latter being coincident with an imaginary line defining the longitudinal center of gravity of the built-up material. If the weld is located on one side or the other of two abutting members then upon contraction a torque is set up about the longitudinal center line of the abutting members. The end result is a physical distortion of the abutting members about an axis defined within the built-up area and proximate to the surface thereof.

This distortion is particularly pronounced for thinner members but is of measurable amount in plates of any thickness.

The conventional technique for avoiding the undesirable aspects of shrinkage and the consequent distortion in abutting welded members involves the preparation of the surface of the members to be welded generally by beveling the abutting surfaces so as to form a groove within which the welded material is gradually built up. Treatment of the aforementioned problem in the conventional manner requires expensive machining of the abutting surfaces.

Upon analysis of the forces involved in welding of prepared surfaces (beveled) it has been ascertained that machining each of the abutting edges to provide a face oriented at 30° to 45° minimizes the adverse effects of the shrinkage forces thus resulting in an included angle of 60° to 90° between.

It is also known that by orienting the members at right angles to each other the adverse forces may be similarly minimized. This realization in part results from the fact that the forces shift in directions as they pass over the center line through the two abutting members. The forces initially act to draw the abutting member inwardly and thus more tightly together; however, after passing through the center line, the forces tend to shift such that there occurs an unbalanced force tending to draw the members outwardly and away from each other.

Accordingly, it is a primary object of the present invention to provide a welded joint wherein distortion is minimized and the amount of locked-in stresses substantially lowered, While at the same time facilitating 100 percent joint penetration more consistently and less costly than by conventional methods.

Consideration is now given to the physical characteristics of the components used in the practice of the present invention. In a conventional joint design calling for the use of tubing, the design is generally limited to the association of tubing of like configurations, i.e., cylindrical to cylindrical or rectangular to rectangular.

In contrast, the present invention involves a welded joint construction of tubular members wherein the horizontally oriented members are preferably of rectangular cross section while the vertically oriented members are of cylindrical cross section. Limited preparation of the surfaces to be joined is required. In this respect opposing faces of the rectangular member are radially notched to partially accommodate the cylindrical surface member. The joint is so designed that welding is limited to the juncture formed by the vertical edges of the rectangular members as it contacts the wall portion of the cylindrical member. The joining of the cylindrical to rectangular tubular members results in several advantages over conventional construction including the requirement of little or no grinding of the weld joint in order to utilize the flush, continuous surfaces of the rectangular members. This association of components is ideal since it permits full advantage to be taken of the maximum compression strength of the vertically oriented cylindrical member plus the near maximum sheer strength of the horizontally oriented rectangular member. The fact that the weld is limited to the vertical edges of the rectangular member precludes the necessity to extensively prepare other portions of these members which might otherwise be in contact. Thus a radial cut is provided in opposed surfaces of the rectangular member to accommodate the cylindrical member. The radial cut is purposely undersized in depth to preclude interference between the two members when welded together. This further precludes the necessity of machining the surfaces to assure a tight fit such as is effected in any conventional joining of rectangular and cylindrical members. There is the further advantage that the radial cut in the rectangular member, being made to generally match the surface of the cylindrical member, provides for ease of alignment in the fabrication process.

Other more specific objects of the invention are set out in the description which follows as well as the claims which constitute a portion of the present disclosure.

Figure 1:
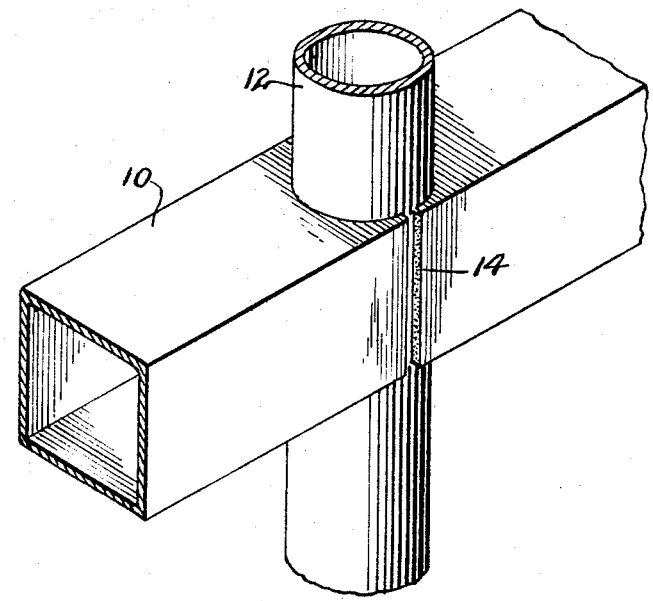
FIG. 1 is a perspective view of a double joint constructed in accordance with the principles of the present invention including two box-shaped rectangular members abutted to and welded along the vertical edges of a cylindrical member.

Referring now to the drawings, particularly FIG. 1, therein are shown the combination of a rectangular member 10 and a cylindrical tube 12 joined in a combination characteristic of the invention.

Figure 2:
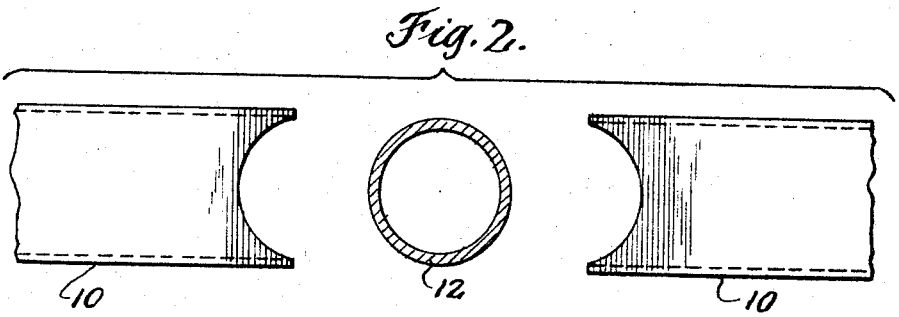
FIG. 2 shows a plan view of the components of FIG. 1 in an exploded view.
Figure 3:
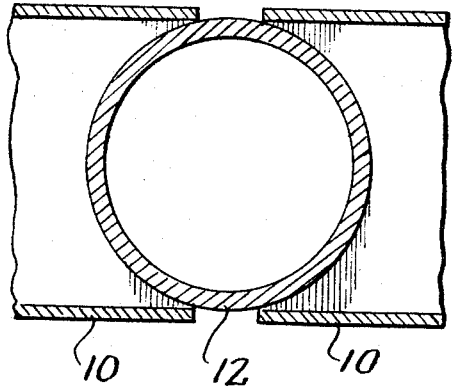
FIG. 3 is a cross-sectional view of the components of FIG. 1.
Figure 4:
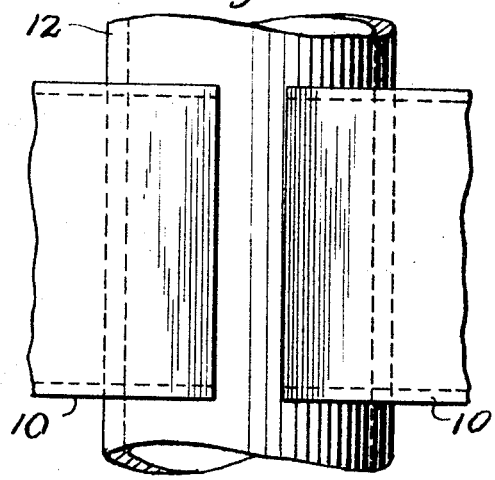
FIG. 4 is a side view of the configuration of FIG. 1 showing in detail the abutting members including the welds along the vertical edges of the rectangular members.

As indicated, in FIGS. 2, 3 and 4 the rectangular member 10 comprises two sections prepared by first cutting to length the members by appropriate means such as a conventional radial type metal cutting saw. Thereafter opposite surfaces of the rectangular tubular members are prepared by means of a radius notching die which shapes the surfaces thereof to con-form generally to the outer surface of the cylindrical tubular member.

It is important to note that although the cooperating surfaces of the representation of FIG. 1 shows rectangular and cylindrical members as being in immediate contact in reality there is substantial clearance provided in the radial notching of the rectangular member such that the vertical sides of the latter avoid contacting cylindrical member 12. The clearance between the vertical sides and the cylinder 12 is on the order of 0.001 to 0.005 inch when the rectangular and cylindrical members have been fitted together. The required clearance is afforded by having the radius notching die positioned off center with respect to the rectangular member 10 such that a shallow notch is produced, i.e., one not able to fully accommodate the cylindrical member. As may be seen in FIG. 3, this results in a slight air gap separating the vertical edges of the rectangular member 10 and the outside wall of the cylinder 12.

In further explanation of the construction of FIG. 1 therein is shown a weld joint area 14 depicting the welding of the vertical face of the rectangular member 10 to the cylindrical member 12.

A significant facet of the present invention is this limiting of the weld area to the vertical edges of the rectangular members.

The welding operation is preferably accomplished by means of an automatic welding technique. The automatic welding operation is preferably performed simultaneously along both edges of a rectangular member where the latter abut the cylindrical member. This simultaneous weld operation reduces the possibility of induced distortion or of locked-in stresses in the areas of the weld.

The fact that the vertical cylindrical tubing is smaller in diameter than the overall width of the rectangular tubing by an amount approximately equal to two times the wall thickness of the rectangular tubing results in allowable shrinkage across the weld metal throat. The welding thus results in the drawing-in of the vertical edges of the rectangular tubing toward the wall of the cylindrical tubing. Because of the previous radius notching of the rectangular member, the vertical edges of the latter offer some degree of flexibility or yield. This in turn means that the edges are capable of being drawn tighter to the cylindrical wall since they offer less restraint. This in turn results in a lower locked-in stress.

When all four vertical edges of the two rectangular members are welded the two rectangular members are drawn tighter toward the wall of the cylindrical tubing. Yield of the cylindrical wall toward the weld throat is considered to be advantageous because of the direction of rolling which will always be parallel to this particular weld joint.

In order to facilitate the movement of the vertical edges of the rectangular members they are chosen to be of slightly thinner stock than the walls of the cylindrical tubing.

Although the material used in the construction of the subject joint is preferably low carbon steel, this should not be construed as limiting it being readily apparent that any weldable material may be employed.

It should be further readily apparent that the practice of the present invention is not limited to the situation in which a continuous weld is applied as at 14. Thus a technique of periodically tack welding along the vertical face may be equally effective in certain situations, i.e., rectangular members greater in length than in width.

I claim:

1. A method of structurally joining a first member of rectangular cross section with a cylindrical member comprising the steps of providing a curved notch in two opposing edge portions of said rectangular member sufficient to accomodate a portion of the outside curved surface of said cylindrical member, positioning said cylindrical member within the circularly notched portions of said rectangular member such that only the curved notched portions of said rectangular member are in contact with said cylindrical member, the two other opposing surfaces of said rectangular member being juxtaposed to but separated from the outer surface of said cylindrical member, and welding along the unnotched edge portions of said rectangular member.

2. The method of claim 1 wherein said member of rectangular cross-section comprises a hollow tubular member.

3. The method of claim 1 wherein said member of circular cross-section comprises a hollow cylindrical member.

4. The method of claim 1 wherein said member of circular cross-section has an outside diameter which is less than the width of said member of rectangular cross-section by approximately two times the wall thickness of said rectangular member.

5. The method of claim 1 wherein the curved notching of said rectangular member is performed by means of a curved notching die.

6. The method of claim 5 wherein the curved notching die is positioned with respect to the one end of said rectangular member such that a less than semi-circular curved notch is produced in said rectangular member whereafter said cylindrical member is positioned within the notched portion of said rectangular member such that said curved notch portion of said rectangular member contacts the wall of said cylindrical member the unnotched edge portion of said rectangular member being separated from said cylindrical member by a slight air gap.

7. The method of claim 1 wherein the angle formed by the free edge portion of said notched rectangular member relative to the cooperating portion of said cylindrical member is on the order of ninety degrees thus forming an ideal weld joint.

* * * * *